H. NICOLAI.
CHERRY SEEDING MACHINE.
APPLICATION FILED MAY 28, 1915.
1,173,372.
Patented Feb. 29, 1916.
3 SHEETS—SHEET 2.
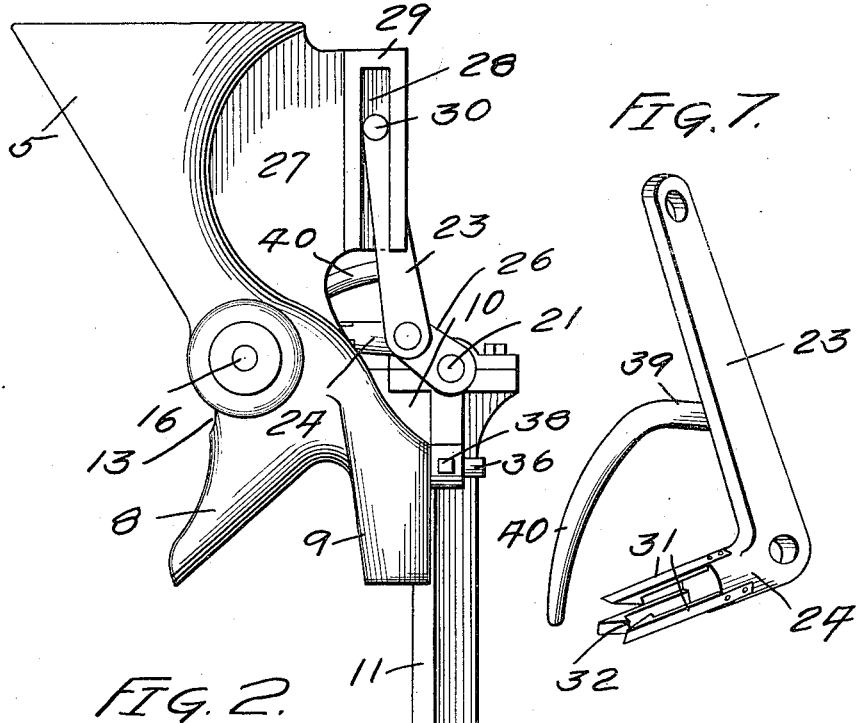

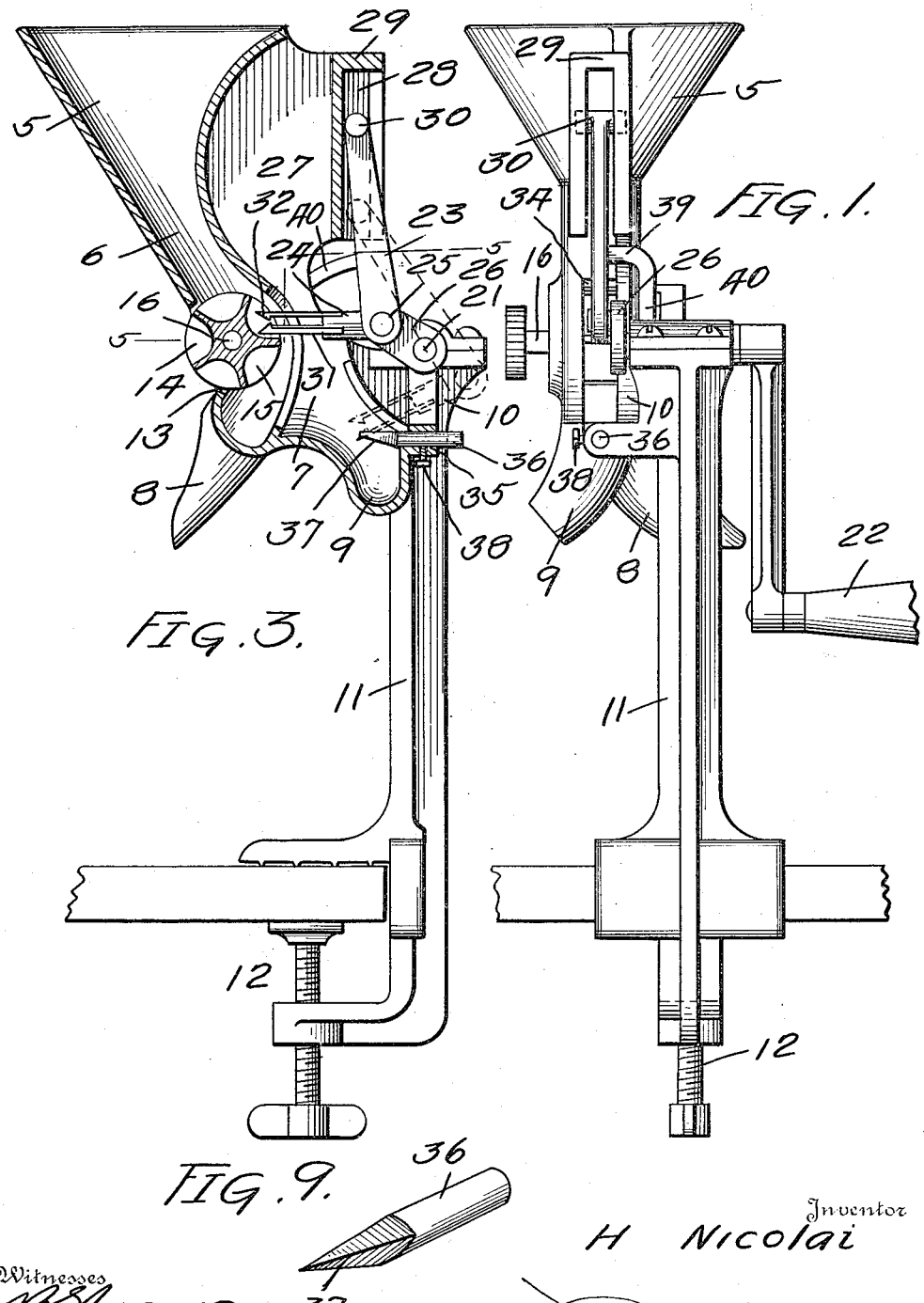

H. NICOLAI.
CHERRY SEEDING MACHINE.
APPLICATION FILED MAY 28, 1915.
1,173,372.
Patented Feb. 29, 1916.
3 SHEETS—SHEET 3.
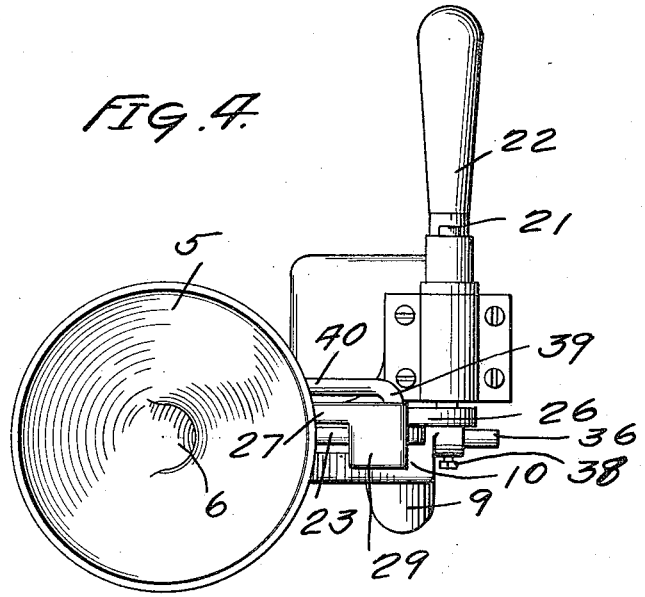
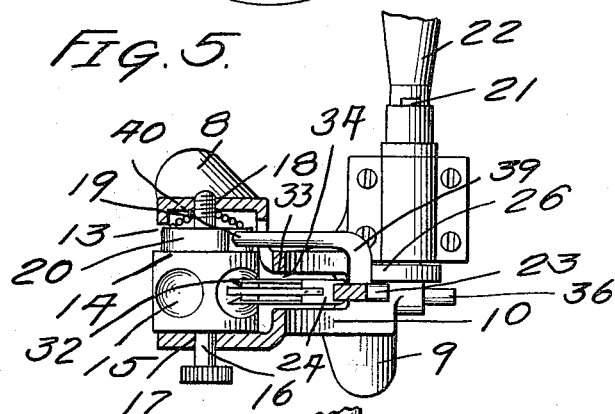
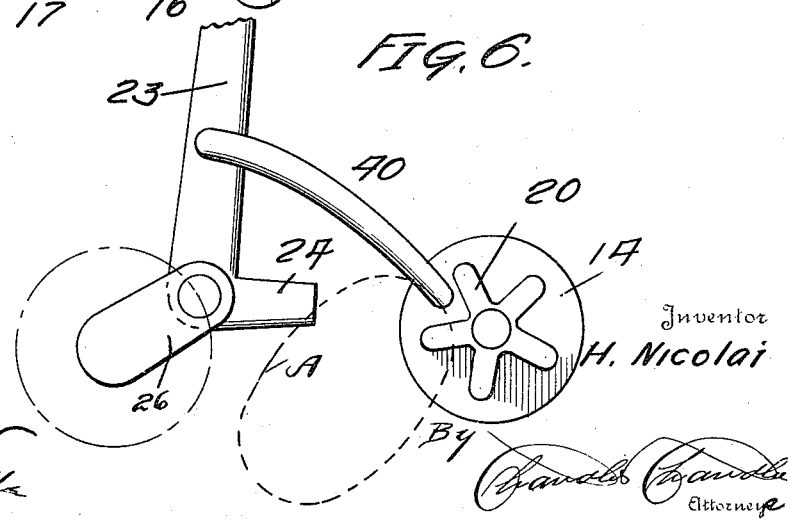

UNITED STATES PATENT OFFICE.

HENRY NICOLAI, OF MILWAUKEE, WISCONSIN.

CHERRY-SEEDING MACHINE.

1,173,372.  Specification of Letters Patent.  Patented Feb. 29, 1916.

Application filed May 28, 1915. Serial No. 31,020.

*To all whom it may concern:*

Be it known that I, HENRY NICOLAI, a citizen of the United States, residing at Milwaukee, in the county of Milwaukee, State of Wisconsin, have invented certain new and useful Improvements in Cherry-Seeding Machines; and I do hereby declare the following to be a full, clear, and exact description of the invention, such as will enable others skilled in the art to which it appertains to make and use the same.

This invention relates to new and useful improvements in machines for pitting or removing the seeds from fruits, and is particularly directed to the provision of a machine for pitting cherries.

It is a primarily the object of the invention to provide a machine for removing the seeds from cherries in such manner that they suffer the least possible mutilation during the operation.

It is further the object of the invention to provide such a machine which may be operated to separate the stones from the cherries in a quick and efficient manner and which is so arranged that there is no tendency for the cherries or seeds to clog therein.

It is still further the object to provide such a machine which comprises a minimum number of operative parts and which is so designed that it may readily be disassembled and thoroughly cleaned after each operation thereof.

With the above and other objects and advantages in view, the invention resides more particularly in the novel combination, formation and arrangement of parts hereinafter described and specifically pointed out in the appended claims.

Reference is had to the accompanying drawings wherein similar characters of reference designate corresponding parts throughout the several views, and in which:

Figure 1 is a side elevation of a desired form of the improved cherry pitting machine. Fig. 2 is an end elevation of the structure shown in Fig. 1. Fig. 3 is a central vertical sectional view taken through the machine and showing the pitting mechanism in its initial engagement with the cherry. Fig. 4 is a top plan view of the improved machine. Fig. 5 is a sectional view on the line 5—5 of Fig. 1. Fig. 6 is a view showing the movement of the pitting member of the machine. Fig. 7 is a perspective view of the cherry pitting member, Fig. 8 is a perspective view of the cherry holding member, and Fig. 9 is a detail perspective view of the tine spreading member.

Referring now more particularly to the accompanying drawings, there is provided a casing including the hopper 5, and a passage 6 leading therefrom of such size as to permit the passage of only one cherry therethrough. This passage is enlarged or widened at 7 to provide a pitting chamber and is divided at its lower end to form the cherry discharge spout 8 and the seed discharge spout 9. The casing is also extended at 10 adjacent the pitting chamber to provide a housing and bearings for the pitting mechanism. A standard 11 is formed on this portion of the casing and is provided at its lower end with a conventional clamping device 12 whereby it may be secured to and supported above a table.

To provide an easily removable means for conveying cherries individually from the passage 6 past the pitting mechanism, the casing below said passage is provided with an opening 13 and positioned in this opening is a drum or cylinder 14 which is provided with a plurality of spaced pockets 15 in its periphery for individually receiving a cherry from the passage. This cylinder is rotatably mounted on a shaft 16 which is slidably passed through an opening 17 in one side of the casing, and which is threadably engaged in an opening 18 in the other side. The cylinder is held against undesired rotation through the medium of a spiral spring 19 surrounding the shaft and bearing against said cylinder and the casing. The cylinder is further provided with a plurality of gear teeth 20, each corresponding to a respective pocket and adapted to be engaged by a portion of the pitting mechanism to rotate the cylinder one step and bring another cherry into position for pitting. It is seen that by removing the shaft 16, the cylinder can be withdrawn from the casing and be cleaned and access had to the interior of the casing.

The pitting mechanism comprises a shaft 21 journaled transversely on the portion 10 of the casing, and carrying at its outer end a crank 22 whereby it may be rotated to operate the machine. An angular member is provided comprising the substantially vertical arm 23 and the horizontal arm 24 extending into the casing, and provided at its angle with a bearing 25 journaled on an offset or crank portion 26 on the shaft 21, and held against displacement by a nut threaded on the extremity of said portion. The hopper portion of the casing is provided with a flange 27 and carried by said flange is a portion 29 forming a keyhole slot 28 in which are slidably held pintles 30 formed on the upper end of the arm 23. Secured on the arm 24 are spring tines 31 which are preferably three in number and disposed in regular spaced relation about the arm with one of them at the top thereof. Hook members 32 are carried at the ends of said tines and said tines are adapted to be engaged with a cherry in one of the pockets 15, and to firmly grip the seed of said cherry. Due to the crank 26 and the sliding movement of the pintles 30, rotation of the shaft 21 will cause the outer ends of the tines to move in a substantially elliptical path indicated by the dot and dash line A so that the tines will be disposed in the pockets of the cylinder and then will swing to a position over the seed discharge spout 9. To prevent the cherry from being drawn out of the pocket and thus follow the seed, the pitting chamber is provided with a transverse partition 33 formed with a vertical slot 34 in which the tines work, this slot being of sufficient width to permit the passage of the tines, and a seed therethrough but near enough to prevent the passage of the cherry, so that said seed will be separated from the cherry and the cherry will fall out through the slot 8. To separate the tines adjacent their lowermost point of movement so that they will allow the seed to drop, the casing is provided with a passage 35 in which is slidably positioned a bar 36 having its inner end extended into the path of the tines and wedge shaped so as to spring said tines apart to release the seed. The bottom of this bar is beveled at 37 to assist in forcing a seed from the tines should it become stuck thereto. Adjustment of this wedge bar is had through the medium of a set screw 38 threaded in the casing and engaging said bar. Movement of the cylinder 14 in successive steps is accomplished by an arm 39 extending laterally from the intermediate portion of the arm 23 and then directed inwardly at 40 into the casing and adapted successively to engage the gear teeth 20.

Thus it is seen that a machine has been provided which will efficiently perform the functions set forth. It is observed that when the tines enter a cherry, they are sprung together and expand within the cherry upon engagement with the seed to grasp it and it will be further observed that the seed is removed from the cherry through the same opening which the tines make in entering.

The device as described, is adapted for household use, but it will be readily appreciated that the principles set forth may be equally well embodied in machines of a multiple character for use in factories.

What is claimed is.

1. A machine of the class described comprising a casing enlarged at its upper end to form a hopper, a drum rotatably mounted in the casing and provided with fruit holding pockets, said casing terminating below the drum in a fruit discharge chute, the casing being provided adjacent the drum with a slot, a pitting member movable through the slot to engage a seed of a fruit within a pocket of the drum to draw said seed through the slot, means for causing said pitting member to release the seed on the side of the slot opposite the drum and a chute extending from said side of the slot.

2. A machine of the class described comprising a casing including a passage, a drum rotatably mounted in the passage, gear teeth formed on one end of the drum, a shaft journally carried by the casing, a crank on said shaft, an angular member journaled at its angle on the crank, seed engaging tines carried by one arm of said member, guide means slidably holding the other arm of the member and a laterally off-set arm carried by the said other arm of the member and engageable with the teeth on said drum to rotate it in successive steps upon rotation of the crank.

3. A machine of the class described comprising a casing including a passage, a cylindrical member mounted under the passage and provided with a plurality of pockets for individually receiving the fruit from the passage, a pitting member movable in a curved path toward and away from said cylindrical member to engage a fruit in one of the pockets and means operated by the pitting member for moving the cylinder in successive steps, such movement occurring simultaneously with movement of the pitting member in and adjacent said pockets.

4. A machine of the class described comprising a fruit holding member, a member including spring tines movable toward and away therefrom in a curved path to remove a seed, and a substantially wedge shaped member adapted to be engaged by said tines to force them apart.

5. A machine of the class described comprising a casing including a passage, a fruit holding member associated with said passage, a shaft journaled on the casing, a crank on said shaft, an angular member journaled on the crank, seed engaging tines carried by one arm of said member and guide means slidably holding the other arm of said member.

6. A machine of the class described comprising a casing including a passage, a cylindrical fruit holding member associated with the said passage and provided with fruit receiving pockets, gear teeth on said member, a shaft journaled on the casing, a crank on said shaft, and angular member journaled on the crank, seed engaging tines carried by one arm of said member, a guide slidably holding the other arm of said member and an arm on said other arm adapted to engage said gear teeth successively to rotate the cylinder.

7. A machine of the class described comprising a casing including a fruit passage enlarged at its lower portion to provide a pitting chamber, and divided therebelow to form discharge spouts, a partition in said chamber provided with a vertical slot, a fruit holding member on one side of the partition, a pitting member on the other side thereof, and movable through the slot, and means for simultaneously moving the fruit holding member during such movement of the pitting member.

8. In a machine of the class described the combination with a casing and a pitting member including a plurality of resilient seed engaging tines of means for releasing a seed from said tines comprising a bar passed through the casing and beveled to form a wedge engageable between certain of the tines, and means for adjustably holding said bar.

In testimony whereof, I affix my signature, in the presence of two witnesses.

HENRY NICOLAI.

Witnesses:
 A. SALSMAN,
 AUGUST PAUTSCH.

Copies of this patent may be obtained for five cents each, by addressing the "Commissioner of Patents, Washington, D. C."